United States Patent
Peng et al.

(10) Patent No.: US 10,990,889 B2
(45) Date of Patent: Apr. 27, 2021

(54) GENERATING A PREDICTIVE BEHAVIOR MODEL FOR PREDICTING USER BEHAVIOR USING UNSUPERVISED FEATURE LEARNING AND A RECURRENT NEURAL NETWORK

(71) Applicant: Adobe Inc., San Jose, CA (US)

(72) Inventors: Bo Peng, Santa Clara, CA (US); Julia Viladomat, Palo Alto, CA (US); Zhenyu Yan, Cupertino, CA (US); Abhishek Pani, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 810 days.

(21) Appl. No.: 15/812,568

(22) Filed: Nov. 14, 2017

(65) Prior Publication Data
US 2019/0147356 A1  May 16, 2019

(51) Int. Cl.
*G06N 7/00* (2006.01)
*G06N 3/08* (2006.01)
*G06N 3/04* (2006.01)

(52) U.S. Cl.
CPC ........... *G06N 7/005* (2013.01); *G06N 3/0445* (2013.01); *G06N 3/0454* (2013.01); *G06N 3/0472* (2013.01); *G06N 3/08* (2013.01); *G06N 3/088* (2013.01)

(58) Field of Classification Search
CPC ................................. G06N 3/08; G06N 7/005
See application file for complete search history.

(56) References Cited

U.S. PATENT DOCUMENTS

2016/0188726 A1* 6/2016 Shang ................. G06F 16/9032
707/706
2019/0167182 A1* 6/2019 Sejdic ................. G06K 9/6267

* cited by examiner

*Primary Examiner* — Li B. Zhen
*Assistant Examiner* — Mikayla Chubb
(74) *Attorney, Agent, or Firm* — Kilpatrick Townsend & Stockton LLP

(57) ABSTRACT

Certain embodiments involve a model for predicting user behavior. For example, a system accesses user behavior data indicating various users' behaviors during intervals over various periods of time and target behavior data indicating a particular user behavior. The system associates each user with a label that indicates whether a user performed a particular action during or after a time period based on the target behavior data. The system uses the user behavior data to train various deep Restricted Boltzmann Machines ("RBM") to generate representations of each user over each period of time that indicate the user behavior over the time period. The system generates a predictive model by connecting the RBMs into a deep recurrent neural network and uses the target behavior data associated with each user, along with the representations of each user, as input data to train the deep recurrent neural network to predict user behavior.

20 Claims, 8 Drawing Sheets

GENERATING A PREDICTIVE BEHAVIOR MODEL FOR PREDICTING USER BEHAVIOR USING UNSUPERVISED FEATURE LEARNING AND A RECURRENT NEURAL NETWORK

TECHNICAL FIELD

This disclosure generally relates to machine-learning and more specifically to generating a model for predicting user behavior using unsupervised feature learning and a deep recurrent neural network.

BACKGROUND

Certain systems use various methods and techniques to predict user behavior. The systems predict user behavior using various data about the user, including, for example, the user's behavior over one or more time periods. Predicting or monitoring user behavior can be useful for various purposes or operations. For example, certain customer retention efforts involve monitoring or predicting user behavior such as, for example, user churn behavior, which refers to a likelihood of a user abandoning a service, a subscription, a product, etc. after a period of time of use. Monitoring or predicting user behavior can be beneficial for one more purposes such as, for example, customer relation operations that involve allocating resources to retain users that are likely to abandon a service, subscription, product, etc.

Existing systems and methods for monitoring or predicting user behavior may require human intervention to determine one or more features or representations indicating user behavior (e.g., a summary of a user's behavior over a period of time), which can lead to inaccurately determining or predicting subsequent user behavior. In addition, determining or predicting user behavior involves analyzing large data sets, which makes it difficult for human observers and existing systems and methods to accurately determine or predict user behavior. For instance, existing systems and methods for predicting or determining user behavior may be susceptible to noise or randomness in large data sets indicating various users' behaviors over a period of time, which causes current systems and methods to inaccurately determine or predict user behavior. Moreover, existing machine-learning systems and methods for determining or predicting user behavior do not account for temporal user behavior or time dependent user behavior (e.g., a user's behavior over various short and/or long time periods), which can also lead to inaccurately determining or predicting user behavior.

Thus, existing systems and methods for determining or predicting user behavior present various disadvantages such as, but not limited to, those discussed above. For these and other reasons, improved techniques for learning and predicting user behavior are therefore desirable.

SUMMARY

Various embodiments of the present disclosure provide systems and methods for generating a predictive behavior model for predicting user behavior using unsupervised feature learning and a deep recurrent neural network.

In one example, a method for generating a model for predicting user behavior includes accessing, by the processor, a first representation of a user of a plurality of users and a second representation of the user. The first representation includes data about a first behavior of the user over time intervals during a first time period and the second representation including data about a second behavior of the user over time intervals during a second time period. The method further includes accessing, by the processor, a deep recurrent neural network that includes a first deep restricted Boltzmann machine connected to a second deep restricted Boltzmann machine. The method further includes encoding, by the processor and with the first deep restricted Boltzmann machine, the first representation into a first feature representation that is representative of the first behavior. The method also includes encoding, by the processor and with the second deep restricted Boltzmann machine, the second representation into a second feature representation that is representative of the second behavior. The method also includes generating, by the processor, a predicted user behavior model of the user by applying the deep recurrent neural network to input data. The input data includes the first and second feature representations and a user behavior label associated with the user. The user behavior label indicates whether the user performed a particular action during or after the first or second time period.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

DETAILED DESCRIPTION

Figure 1:
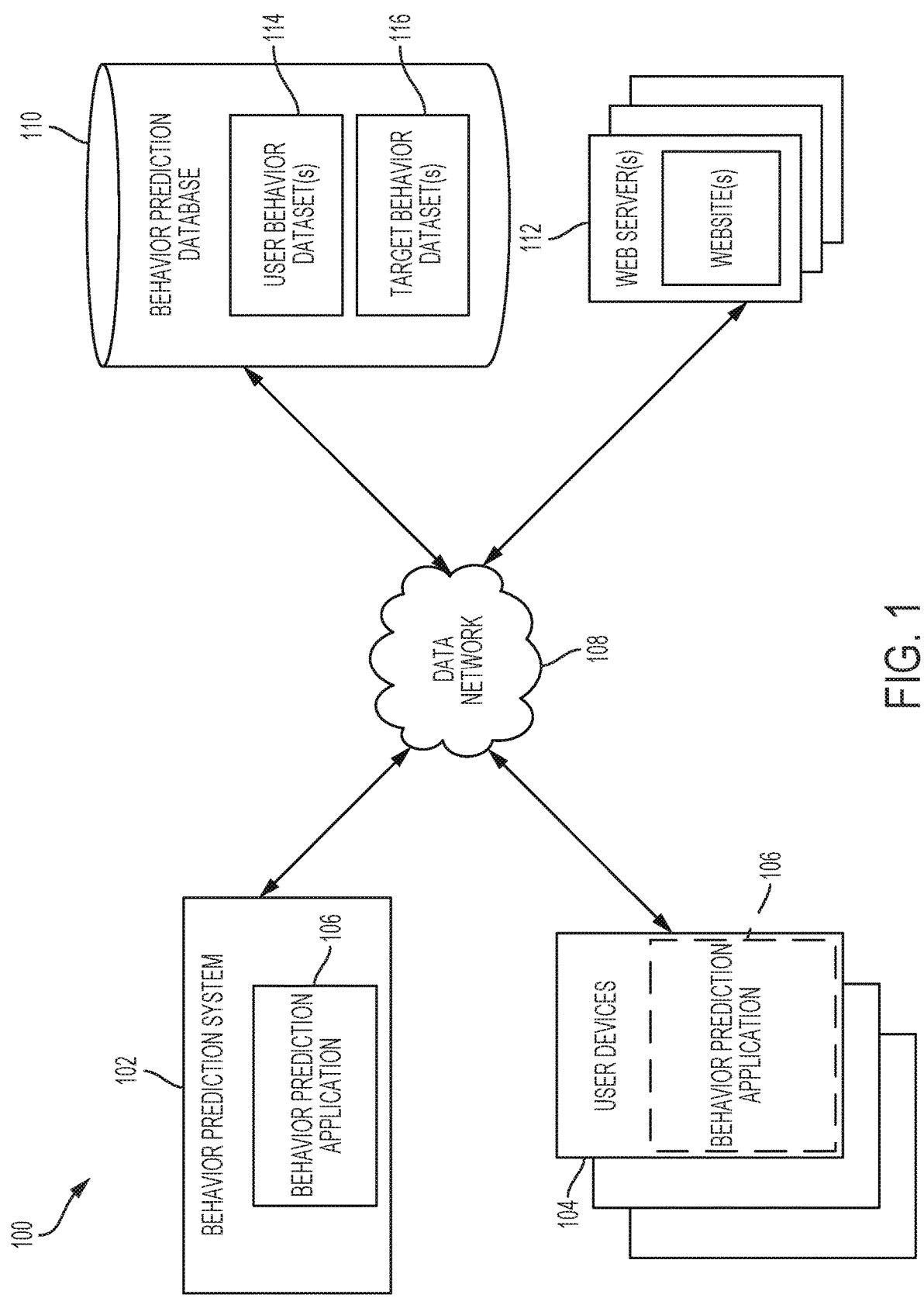
FIG. 1 is a block diagram of an exemplary environment in which a behavior prediction system generates a model for predicting user behavior using unsupervised feature learning and a recurrent neural network in accordance with one or more embodiments.

Embodiments described herein involve a model for predicting user behavior using unsupervised feature learning and a deep recurrent neural network. For example, a behavior prediction system accesses user behavior data indicating various users' behaviors during time intervals over various periods of time. The behavior prediction system also obtains target behavior data that indicates a particular user behavior that can be predicted by the behavior prediction system and associates each user with a target label that indicates whether a user performed a particular action during or after a time period based on the target behavior data. The behavior prediction system uses the user behavior data to train various deep Restricted Boltzmann Machines ("RBM") to generate various feature representations of each user over each period of time that indicates the user behavior over the time period (e.g., a feature representation that describes the user's behavior over a thirty day period). The behavior prediction system generates a predictive model by connecting the various RBMs into a deep recurrent neural network and uses the target behavior data associated with each user (e.g., the target label associated with each user), along with the various feature representations of each user generated by the RBMs, as input data to train the deep recurrent neural network to predict user behavior.

Thus, in some embodiments, the behavior prediction system uses one or more unsupervised deep neural networks (e.g., one or more deep RBMs) to generate short-term feature representations of various users over various time periods and connects the unsupervised deep neural networks into a recurrent neural network, which can use the unsupervised deep neural networks and short-term feature representations to predict subsequent user behavior. In this manner, the behavior prediction system uses unsupervised deep neural networks, which can be less susceptible to noise or randomness in user behavior data sets and obviate the need for human intervention in generating feature representations of users, along with a recurrent neural network that can model time dependent or temporal user behavior, to accurately predict user behavior.

The following non-limiting example is provided to introduce certain embodiments. A behavior prediction system receives or obtains user behavior data indicating various users' behavior with respect to one or more products, services, subscription, etc., during time intervals over a first and second time period (e.g., each user's daily use of a product over a first thirty day time period and a second thirty day time period). The behavior prediction system accesses or generates a first representation of a user of the various users and a second representation of the user. In this example, the first representation includes data about a first behavior of the user over time intervals during the first time period and the second representation includes data about a second behavior of the user over time intervals during the second time period. As an example, a representation indicates a type, usage, etc. of a product used by the user during each day, week, etc. over a thirty day period. The behavior prediction system can access a deep recurrent neural network that includes one or more connected unsupervised deep neural networks (e.g., one or more RBMs) and use the unsupervised deep neural networks to encode the first and second representations of the user into feature representations that correspond to the user's behavior over each time period (e.g., a feature representation that describes or represents the user's behavior during the first and second time periods). For example, the behavior prediction system uses a first RBM to encode the first representation into a first feature representation that is representative of the first behavior of the user (e.g., indicates the user's behavior during the first thirty day period) and uses a second RBM to encode the second representation into a second feature representation that is representative of the second behavior of the user (e.g., indicates the user's behavior during the second thirty day period).

Continuing with this example, the behavior prediction system generates a predicted user behavior model by applying the deep recurrent neural network to input data. In this example, the input data includes the first and second feature representations generated by the connected unsupervised deep neural networks and a user behavior label associated with the user that indicates whether the user performed a particular action during or after the first or second period of time. In some examples, the behavior prediction system can use the predicted user behavior model to predict user behavior. For example, the behavior prediction system generates a predicted user behavior model by connecting the first and second unsupervised deep neural networks into the recurrent neural network and using the feature representations generated by each unsupervised deep neural network (e.g., the first and second feature representations), along with the user behavior label as inputs into the recurrent neural network. In this example, the user behavior label can include a churn label that indicates the user's churn behavior (e.g., a churn label that indicates whether the user abandoned a service, product, or subscription during or after the first or second period of time). The behavior prediction system uses the inputs to train the recurrent neural network to predict a particular user behavior (e.g., to predict or determine a likelihood of a subsequent user abandoning a service or product). For instance, the behavior prediction system classifies or groups users based on a similarity between feature representations of the users (e.g., groups together users that have similar user behavior with respect to a product or service) and identifies a churn label associated with each user in each group. In this example, the behavior prediction system can use the predicted user behavior model to predict or determine a likelihood of a subsequent user abandoning a service or product. As an example, the behavior prediction system obtains data about the subsequent user's behavior with respect to a service or product and generates a feature representation for the subsequent user. The behavior prediction system compares the subsequent user's feature representation to feature representations of users in various groups, identifies a group of users having similar user behaviors as compared to the subsequent user, and uses the predicted user behavior model to predict or determine a likelihood of the subsequent user abandoning a service or product based on various churn labels associated with one or more users in the identified group of users. As an example, the behavior prediction system determines that there is a high likelihood that the subsequent user will abandon a service in response to determining that the subsequent user's behavior with respect to the service is similar to the user behavior of a particular group of users and that the users of the particular group are associated with a churn label that indicates that users abandoned the service after a particular period of time or amount of time.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram of an exemplary environment 100 in which a behavior prediction system 102 generates a model for predicting user behavior using unsupervised feature learning and a recurrent neural network in accordance with one or more embodiments.

The environment 100 includes the behavior prediction system 102, one or more user devices 104, a behavior prediction database 110, and a web server 112 that provides one or more websites. The behavior prediction system 102, the user devices 104, the behavior prediction database 110, and the web server 112 are communicatively coupled via one or more data networks 108 (e.g., the Internet, one or more local area networks ("LAN"), one or more wired area networks, or some combination thereof).

In some embodiments, a user of the user device 104 visits a webpage or an application store to explore applications supported by the behavior prediction system 102. The behavior prediction system 102 provides the applications as a software as a service ("SaaS"), or as a standalone application that can be installed on one or more of the user devices 104, or as a combination.

In some embodiments, the behavior prediction system 102 can be any user device that generates a model for predicting user behavior using unsupervised feature learning and a recurrent neural network. In some examples, the behavior prediction system 102 is implemented on one or more servers and a user interfaces with the one or more user devices 104 to access the behavior prediction system 102 via the data network 108.

In the example depicted in FIG. 1, a user can interface with the one or more user devices 104 to access the behavior prediction system 102. Each of the user devices 104 represents various types of client devices. For example, the user device 104 is a mobile device (e.g., a mobile telephone, a smartphone, a PDA, a tablet, a laptop, a camera, a tracker, a watch, a wearable device, etc.). The user device 104, however, in some embodiments, is a non-mobile device (e.g., a desktop computer or another type of client device). In some embodiments, the behavior prediction system 102 is executed on the one or more user devices 104 via a behavior prediction application 106. In this example, the user devices 104 include one or more of the components of the behavior prediction system 102.

The behavior prediction database 110 stores one or more user behavior datasets 114 and target behavior datasets 116. The user behavior dataset 114 includes one or more data sets indicating various users' behavior with respect to one or more services, products, etc. during time intervals over various periods of time (e.g., each user's daily, weekly, or monthly use of a product over various thirty day or ninety day time periods or any other suitable interval or period of time). Examples of data included in the user behavior dataset 114 include, but are not limited to, data indicating a type, usage, frequency of use, time of use, etc. of a product or service used by a user over a period of time. In some embodiments the user behavior dataset 114 includes one or more representations of a user. A representation of a user can indicate the user's behavior with respect to a service, product, etc. over time intervals during a period of time. In some examples, the user behavior data set 114 includes a matrix that indicates a representation of a user (e.g., a matrix that represents the user's daily use of, or interaction with, a product or service during a thirty day time period).

The target behavior dataset 116 includes data associated with a particular target user behavior that can be predicted by the behavior prediction system 102. As an example, the target behavior dataset 116 includes user churn data indicating whether a user abandons a service or product after or during a period of time (e.g., whether the user abandoned a service or product during a thirty day time period). In some embodiments, the user behavior dataset 114 or the target behavior data set 116 includes any data about user behavior.

In some embodiments, the behavior prediction system 102 is communicatively coupled to the behavior prediction database 110 and the behavior prediction system 102 receives or obtains data from the behavior prediction database 110 via the data network 108 or a direct connection. In another embodiment, the behavior prediction system 102 includes the behavior prediction database 110 and can access the behavior prediction database 110.

In some embodiments, the behavior prediction system 102 includes the behavior prediction application 106, which can include one or more instructions stored on a computer-readable medium and executable by one or more processors of one or more computing devices (e.g., a processor of the behavior prediction system 102, the user device 104, or any other computing device). When executed by the one or more processors, the computer-executable instructions of the behavior prediction application 106 cause the behavior prediction system 102 to generate a model for predicting user behavior using unsupervised feature learning and a recurrent neural network.

For example, the behavior prediction application 106 causes the behavior prediction system 102 to obtain or receive the user behavior dataset 114 from the behavior prediction database 110. In some embodiments the behavior prediction application 106 causes the behavior prediction system 102 to access a representation of a user in the user behavior data set. In another embodiment, the behavior prediction application 106 causes the behavior prediction system 102 to generate one or more representations of each user using the user behavior dataset 114. As an example, the behavior prediction application 106 causes the behavior prediction system 102 to access or generate a first representation of a user that includes data about a first behavior of the user over time intervals during a first time period (e.g., represents the user's hourly, daily, or weekly behavior with respect to a product or service during a first thirty day time period) and a second representation of each user that includes data about a second behavior of the user over time intervals during a second time period (e.g., represents the user's hourly, daily, or weekly behavior with respect to the product or service during a second thirty day time period. In some examples, the behavior prediction application 106 causes the behavior prediction system 102 to generate a matrix that indicates a representation of a user (e.g., a matrix that represents the user's daily use of, or interaction with, a product or service during a thirty day time period).

In some embodiments, the behavior prediction application 106 causes the behavior prediction system 102 to access a deep recurrent neural network that includes one or more connected unsupervised deep neural networks such as, for example, a deep Restricted Boltzmann Machine ("RBM"). The behavior prediction application 106 can cause the behavior prediction system 102 to train the one or more unsupervised deep neural networks to encode each representation of a user into a feature representation of the user. In some examples, a feature representation of a user represents or describes the user's behavior over a particular period of time. As an example, the behavior prediction system 102 trains or uses a deep RBM to generate a feature representation for each user that indicates or represents a summary of the user's behavior over a thirty day period with respect to a service, product, etc. (e.g., frequency of use, type of use, time of use, etc.). In some embodiments, the behavior prediction application 106 causes the behavior prediction system 102 to train or use a first unsupervised deep neural network to encode a representation of a user into a feature representation of the user that is representative of a behavior of the user over a first period of time (e.g., over a first thirty day period) and train or use a second unsupervised deep neural network to encode another representation of the user into another feature representation of the user that is representative of another behavior of the user over a second period of time (e.g., over a second thirty day period).

In some embodiments, the behavior prediction application 106 causes the behavior prediction system 102 to obtain or receive the target behavior dataset 116 from the behavior prediction database 110 and the behavior prediction system 102 can associate each user with a user behavior label based on the target behavior dataset 116. In some examples, a user behavior label associated with a user indicates whether a user performed a particular action during or after the first or second period of time. As an example, the target behavior dataset 116 includes user churn data indicating whether a user abandons a service or product during or after the first or second period of time (e.g., whether the user abandoned the service or product within thirty days after the first or second period of time) and the behavior prediction system 102 associates each user with a churn label that indicates the user's churn behavior (e.g., a label that indicates whether the user abandoned the service, product, or subscription during or after the first or second period of time). For example, the behavior prediction system 102 associates a user with a binary churn label that indicates the user's churn behavior (e.g., 0 if the user did not abandon a service or 1 if the user abandoned the service).

In some embodiments, the behavior prediction application 106 causes the behavior prediction system 102 to generate a predicted user behavior model that can be used to predict user behavior. In some examples, the behavior prediction application 106 causes the behavior prediction system 102 to generate the predicted user behavior model by connecting the first and second unsupervised deep neural networks into a recurrent neural network and applying the recurrent neural network to input data. In this example, the input data includes the feature representations of a user generated by the unsupervised deep neural networks and the target behavior dataset 116. In some examples, the behavior prediction system 102 uses the target behavior dataset 116 and the feature representations generated by the unsupervised deep neural networks to train or learn the recurrent neural network to predict a particular user behavior.

For example, the target behavior data set 116 includes user churn data indicating whether a user abandons a service or product after or during a period of time and the behavior prediction system 102 associates a user with a binary churn label that indicates the user's churn behavior. In this example, the behavior prediction system 102 uses the inputs to train the deep recurrent neural network to predict a particular user behavior (e.g., to predict or determine a likelihood of a subsequent user abandoning a service or product or an amount of time after using the service or product that the user will, or is likely to, abandon the service or product). For instance, the behavior prediction system 102 classifies or groups users based on a similarity between feature representations of the users (e.g., group together users that have similar user behavior with respect to a product or service) and identifies a churn label associated with each user in each group. In this example, the behavior prediction system 102 can predict or determine a likelihood of a subsequent user abandoning a service or product. As an example, the behavior prediction system 102 obtains data about the subsequent user's behavior with respect to a service or product and generates a feature representation for the subsequent user. The behavior prediction system 102 compares the subsequent user's feature representation to feature representations of users in various groups, identifies a group of users having similar user behaviors as compared to the subsequent user, and uses the recurrent neural network to predict a likelihood of the subsequent user abandoning a service or product based on various churn labels associated with one or more users in the identified group of users. As an example, the behavior prediction system 102 determines that there is a high likelihood that the subsequent user will abandon a services in response to determining that the subsequent user's behavior with respect to the service is similar to the user behavior of a particular group of users and that the users of the particular group are associated with a churn label that indicates that the group of users abandoned the service after a particular period of time Although the exemplary environment 100 of FIG. 1 is depicted as having a certain number of components, in other embodiments, the exemplary environment 100 has any number of additional or alternative components. Further, while FIG. 1 illustrates a particular arrangement of the behavior prediction system 102, user devices 104, and the behavior prediction database 110, various additional arrangements are possible. As an example, while FIG. 1 illustrates behavior prediction database 110 and the behavior prediction system 102 as part of separate systems, in some embodiments, the behavior prediction database 110 and the behavior prediction system 102 are part of a single system.

Figure 2:
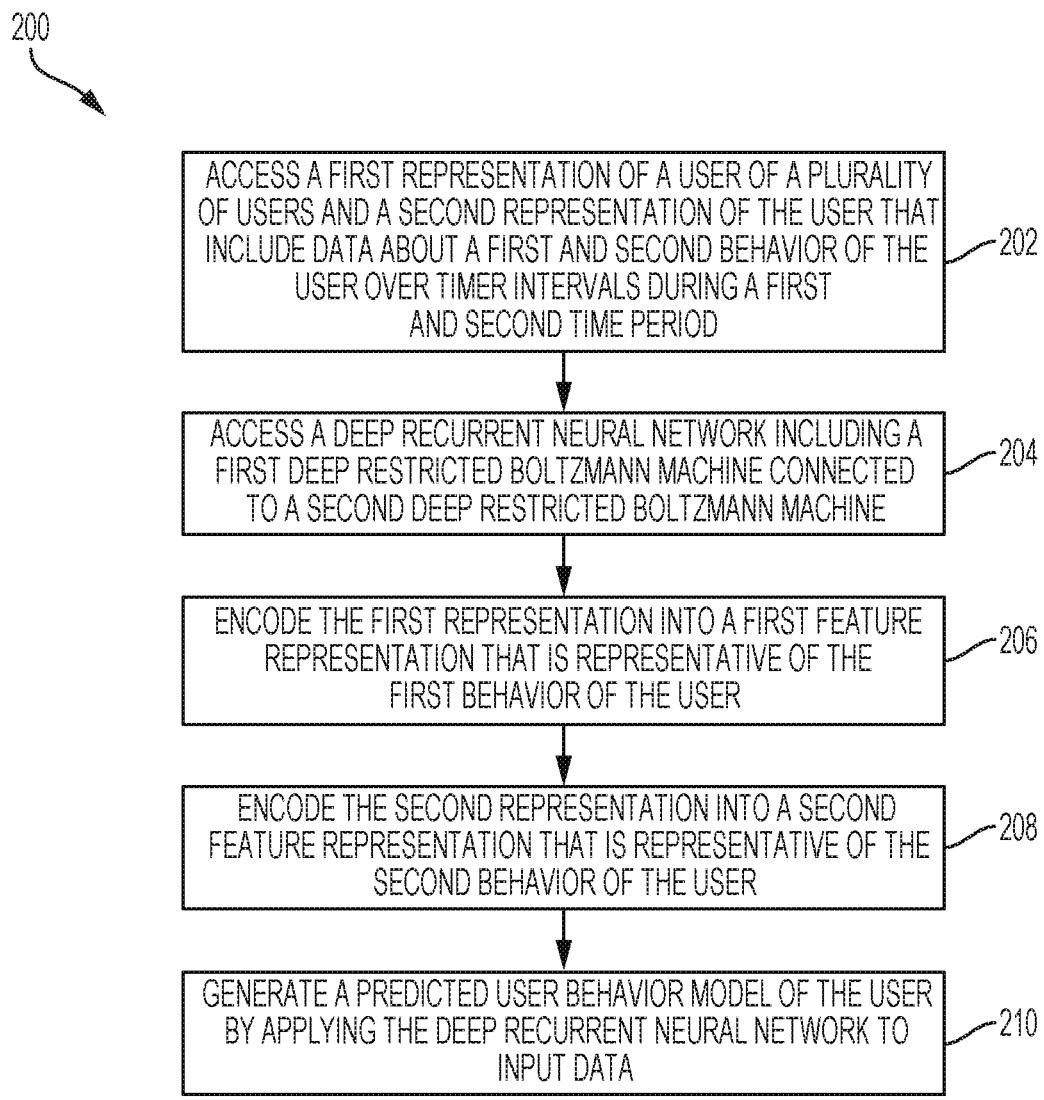
FIG. 2 is a flow chart depicting an example of a process for generating a model for predicting user behavior using unsupervised feature learning and a deep recurrent neural network in accordance with one or more embodiments.

FIG. 2 is a flow chart depicting an example of a process 200 for generating a model for predicting user behavior using unsupervised feature learning and a deep recurrent neural network in accordance with one or more embodiments. In some embodiments, one or more processing devices such as, for example, the computing system described herein with respect to FIG. 8, implement operations depicted in FIG. 2 by executing suitable program code (e.g., the behavior prediction system 102 of FIG. 1) that implements one or more algorithms encompassed by the process 200. For illustrative purposes, the process 200 is described with reference to the examples depicted in FIG. 1, but other implementations are possible.

In block 202, a first representation of a user of a plurality of users and a second representation of the user is accessed. In some embodiments, a behavior prediction system 102 is implemented on, executed by, or stored on one or more user devices 104. In some embodiments, the behavior prediction system 102 or the user device 104 is communicatively or electronically coupled to a behavior prediction database 110 that stores one or more user behavior datasets 114. The user behavior dataset 114 includes data indicating various users' behavior with respect to one or more services, products, etc. during time intervals over various periods of time (e.g., each user's daily, weekly, or monthly use of a product over various thirty day or ninety day time periods or any other suitable interval or period of time). Examples of data included in the user behavior dataset 114 include, but are not limited to, data indicating a type, usage, frequency, etc. of a product or service used by a user over a period of time.

In some embodiments, the behavior prediction system 102 includes a behavior prediction application 106, which can include one or more instructions stored on a computer-readable storage medium and executable by one or more processors of one or more computing devices (e.g., a processor of the behavior prediction system 102, the user device 104, or any other computing device). When executed by the one or more processors, the computer-executable instructions of the behavior prediction application 106 can cause the behavior prediction system 102 to receive or obtain one or more user behavior datasets 114 that indicates different users' behavior over a first time period and a second time period such as, for example, data indicating a type of product or service used by each of the users over a first thirty day time period and a type of product or service used by each of the users over a second thirty day time period.

Figure 3:
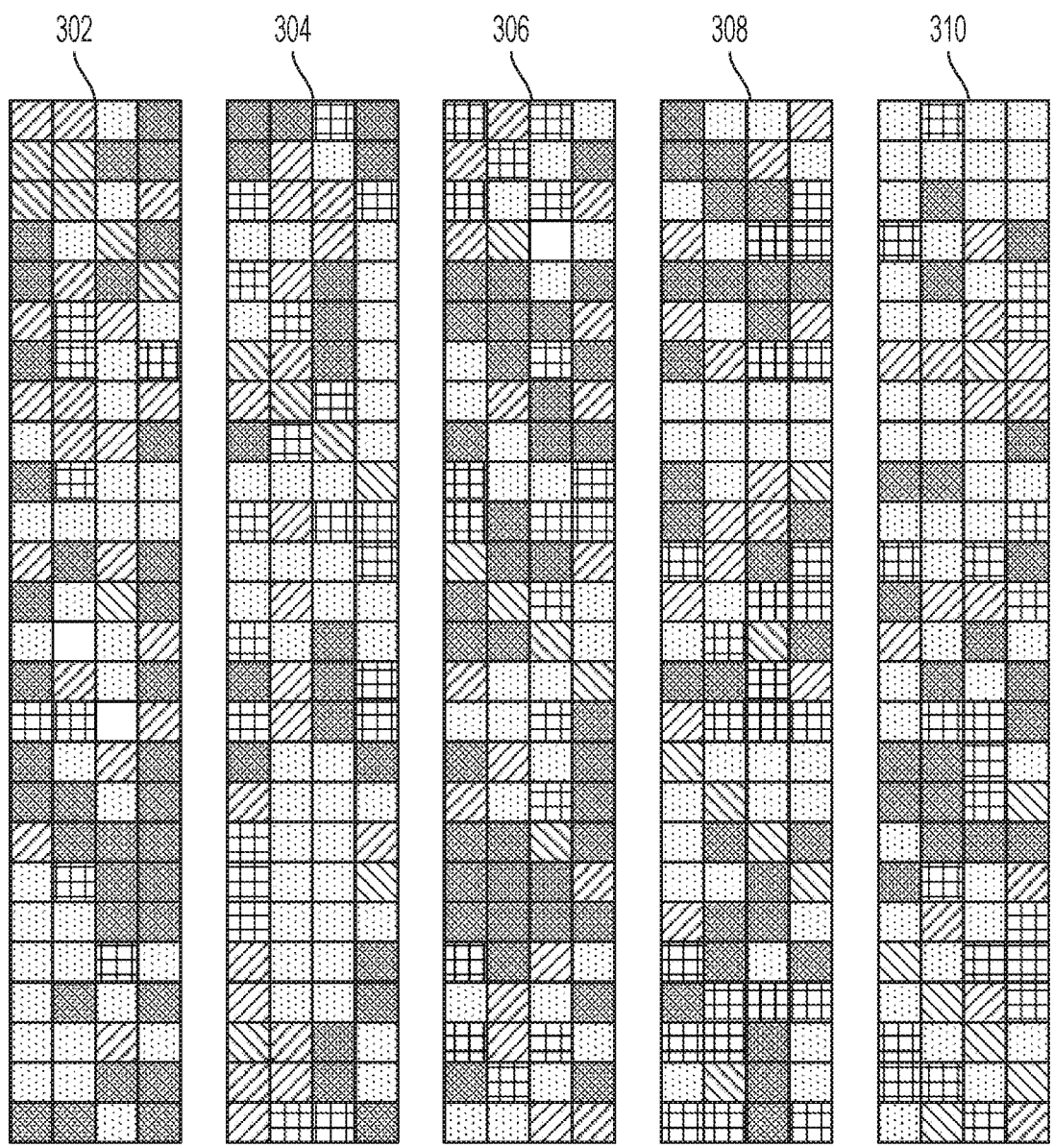
FIG. 3 shows an example of representations of various users that can be used to predict user behavior according to certain embodiments.

In some embodiments, the behavior prediction application 106 causes the behavior prediction system 102 to access or generate the first and second representations of each user. For example, the behavior prediction application 106 causes the behavior prediction system 102 to obtain or receive the user behavior dataset 114 from the behavior prediction database 110 and the user behavior dataset 114 includes a first and second representation of a user. In another example, the behavior prediction system 102 generates a representation of a user based on one or more obtained user behavior datasets 114. A representation of a user can indicate the user's behavior over one or more time intervals during the first time period and the second time period. For example, the behavior prediction application 106 causes the behavior prediction system 102 to access or generate a first representation of each user that includes a first matrix that represents the user's hourly, daily, or weekly behavior during a first thirty day time period with respect to a product or service and a second representation of each user that includes a second matrix that represents the user's hourly, daily, or weekly behavior during a second thirty day time period with respect to the product or service. As an example, FIG. 3 shows an example of representations 302, 304, 306, 308, 310 of various users that can be used to predict user behavior according to certain embodiments. In this example, each representation 302, 304, 306, 308, 310 is a matrix that is generated by the behavior prediction system based on one or more obtained user behavior datasets 114 or accessed from the user behavior datasets 114. Each representation 302, 304, 306, 308, 310 indicates a user's daily behavior over a period of time with respect to a product or service. For example, each row in each representation 302, 304, 306, 308, 310 corresponds to a time interval (e.g., a day) during a first time period and a column in each representation 302, 304, 306, 308, 310 indicates a particular user's interaction or behavior with respect to the service or product during the time interval (e.g., a type, usage, frequency of use, etc. of the product or service on a particular day). In this manner, each representation 302, 304, 306, 308, 310 indicates the user's behavior over various time intervals during a time period.

Returning to FIG. 2, in block 204, a deep recurrent neural network including a first deep Restricted Boltzmann Machine ("RBM") connected to a second RBM is accessed. In some examples, the behavior prediction application 106 causes the behavior prediction system 102 to access the deep recurrent neural network.

In block 206, the first representation of the user is encoded into a first feature representation that is representative of the user's behavior. In some embodiments, the behavior prediction application 106 causes the behavior prediction system 102 to encode the first representation (e.g., the first representation of the user accessed in block 202) into the first feature representation using the first RBM (e.g., the first RBM of the deep recurrent neural network accessed in block 204). In some embodiments, a feature representation of a user describes or indicates the user's behavior over a period of time with respect to a service, product, etc. As an example, the first feature representation of the user represents a summary of the user's first behavior over a first thirty day period, with respect to a service, product, etc. (e.g., frequency of use, type of use, etc.)

Figure 4:
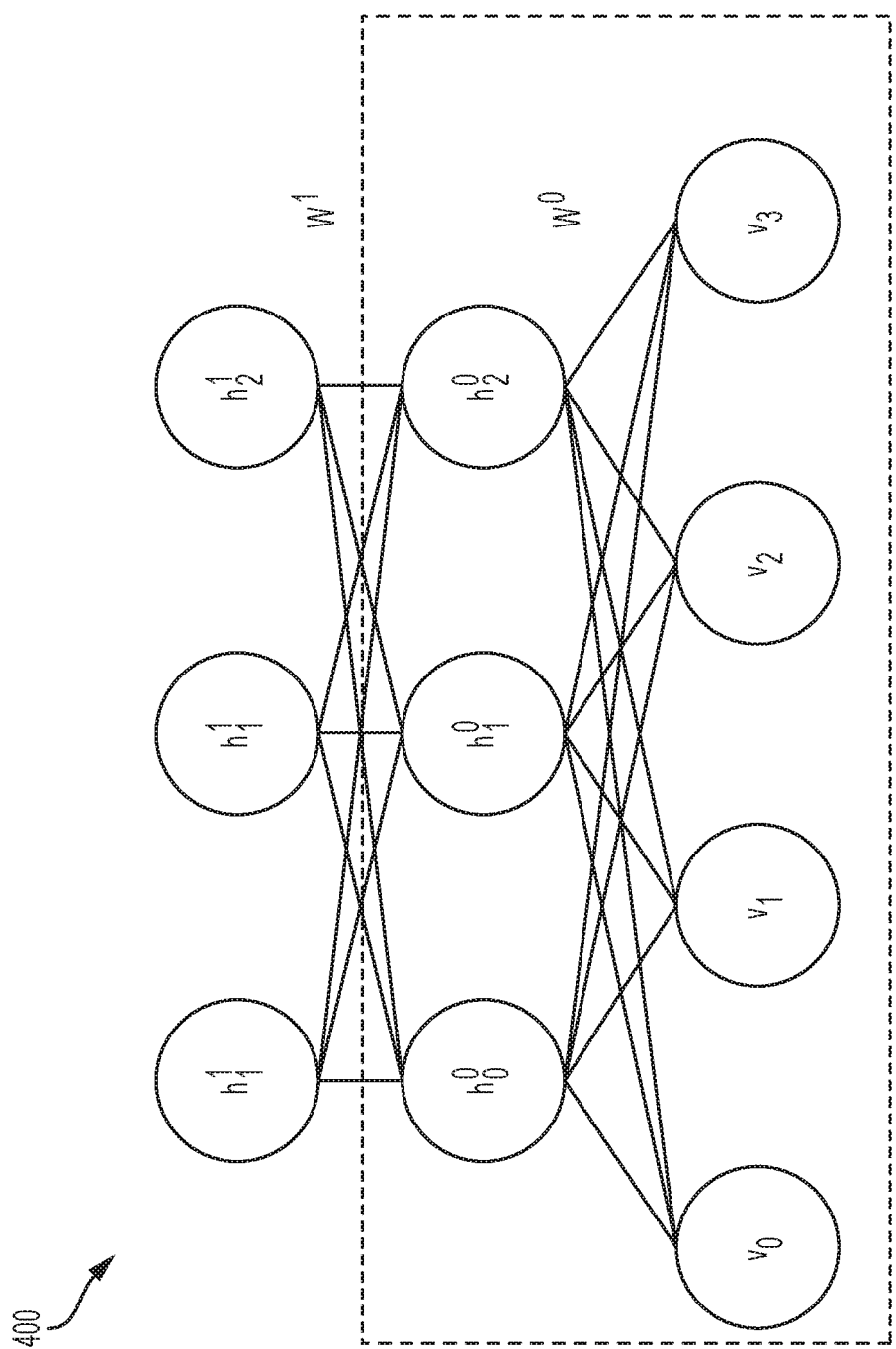
FIG. 4 is an example of an unsupervised neural network that can be used to predict user behavior according to certain embodiments.

In some embodiments, the behavior prediction application 106 causes the behavior prediction system 102 to use the first representation of the user to train one or more unsupervised deep neural networks such as, for example, a deep RBM, to generate or encode a feature representation of the user. For example, FIG. 4 is an example of an unsupervised deep neural network 400 that can be used to predict user behavior according to certain embodiments. In this example, the unsupervised deep neural network 400 is a deep RBM that includes an input layer and one or more hidden layers. In some examples, the behavior prediction system 102 trains the unsupervised deep neural network 400 to generate or encode a feature representation of a user (e.g., in block 206 of FIG. 2). The unsupervised deep neural network 400 can be a machine-learning algorithm or model that can be used for dimensionality reduction, classification, regression, collaborative filtering, feature learning, or topic modeling. In some embodiments, the behavior prediction system 102 trains the unsupervised deep neural network 400 to learn a probability distribution over a set of inputs (e.g., learn a probability distribution of a user being associated with a particular user behavior or vice versa).

In the example depicted in FIG. 4, v represents the input layer of the unsupervised deep neural network 400, which is visible and includes a first representation or second representation of a user (e.g., the first or second representation accessed or generated in block 202), and h represents one or more hidden layers of the unsupervised deep neural network 400. Each of the input layer and the hidden layer include one or more nodes or neuron and the nodes of the input layer and the nodes of the hidden layer can be connected to each other (e.g., via edges connecting one node to another). In this example, the nodes of a hidden layer of the unsupervised deep neural network 400 can be connected to the nodes of another hidden layer of the unsupervised deep neural network 400. In some embodiments, the behavior prediction system 102 can learn or encode a feature representation of a user using the unsupervised deep neural network 400 and one or more algorithms. For example, the behavior prediction system 102 inputs a representation of a user (e.g., a matrix generated or accessed in block 202 of FIG. 2) into the input layer of the unsupervised deep neural network 400 and the unsupervised deep neural network 400 modifies the representation using a weight W associated with a connection between a hidden layer and the input layer and/or one or more offsets or values. In this example, a result of these operations is fed into an activation function that produces an output (e.g., a feature representation of a user) that can be input into a subsequent hidden layer. In some embodiments, the output produced by the unsupervised deep neural network 400 can be a feature representation of the user. In another embodiment, the output produced by the unsupervised deep neural network 400 can be a binary output (e.g., 0 or 1) that indicates the feature representation of the user. In some embodiments, the behavior prediction system 102 trains the unsupervised deep neural network 400 to determine a probability distribution over the representations input into the unsupervised deep neural network 400 and the one or more feature representations generated by the unsupervised deep neural network 400.

For example, the energy of the unsupervised deep neural network 400 can be represented by the following function:

$$E(v,h) = -b'v - c'v - h'Wv$$

In the function above, W represents one or more weights connecting a hidden layer h and the input layer v and b, c are the offsets or biases of the input layer. Continuing with this example, the free energy of the unsupervised deep neural network 400 can be represented or defined by the following formula:

$$F(v) = -b'v - \sum_i \log \sum_{h_i} e^{h_i(c_i + W_i v)}$$

In some embodiments, the structure of the unsupervised deep neural network 400 causes a unit of the input layer and a unit of the hidden layer to be conditionally independent of each other and the probability distributions of a unit of the input layer and unit of the hidden layer is represented by the following probability equations:

$$p(h|v) = \prod_i p(h_i|v)$$

$$p(v|h) = \prod_j p(v_j|h)$$

In this example, the behavior prediction system 102 trains the unsupervised deep neural network 400 to consider binary units in the unsupervised deep neural network 400 (e.g., $v_j$, $h_i \in \{0,1\}$) and obtains the following activation functions for the above probability equations:

$$P(h_i=1|v) = \sigma(c_i + W_i v)$$

$$P(v_j=1|h) = \sigma(b_j + W_j' h)$$

In this manner, the behavior prediction system 102 can train the unsupervised deep neural network 400 to use Gibbs sampling methods and techniques to obtain a probability distribution over a set of inputs such as, for example, v and h. In some embodiments, the behavior prediction system 102 trains the unsupervised deep neural network 400 using one or more algorithms such as, for example, using contrastive divergence methods and techniques.

Figure 5:
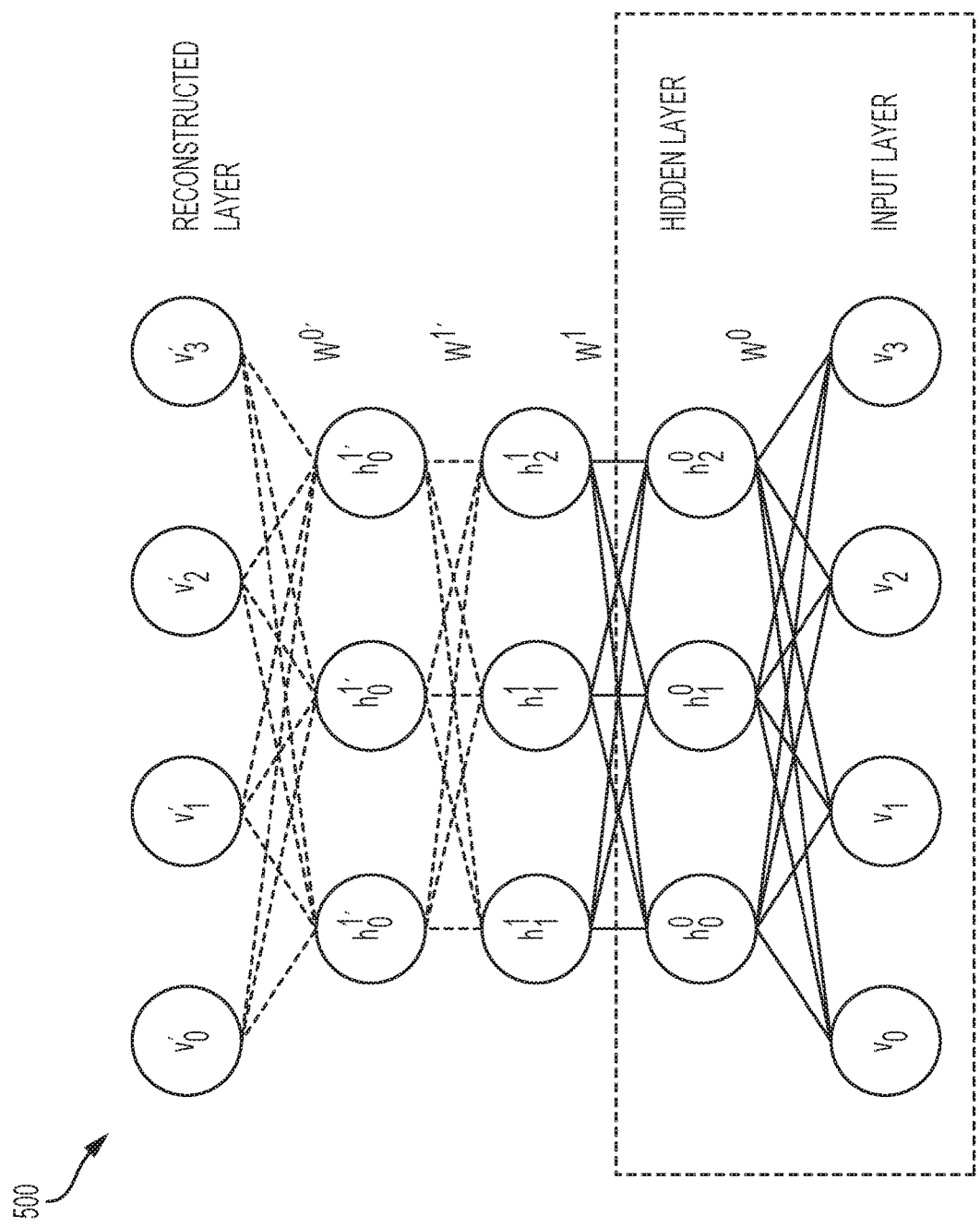
FIG. 5 is an example of another embodiment of the unsupervised neural network of FIG. 4 that can be used to predict user behavior according to certain embodiments.

In some embodiments, the behavior predictions system 102 can train the unsupervised deep neural network 400 to reconstruct input data (e.g., the user behavior dataset 114 obtained in block 202 and input into the unsupervised deep neural network 400) in an unsupervised manner (e.g., without label data) by making one or more forward or backward passes between the visible input layer v and the hidden layer h of the unsupervised deep neural network 400. For example, FIG. 5 is an example of another embodiment of the unsupervised neural network of FIG. 4 that can be used to predict user behavior according to certain embodiments. In the example depicted in FIG. 5, the behavior prediction system 102 generates or creates the unsupervised deep neural network 500 by reconstructing the unsupervised deep neural network 400 of FIG. 4. In this example, the unsupervised deep neural network 500 includes a reconstructed input layer, one or more hidden layers, and an input layer. In some examples, the behavior prediction system 102 generates the unsupervised deep neural network 500 by transposing each weight matrix W as depicted in FIG. 5 (e.g., by weight matrices W associated with connected nodes of the reconstructed input layer and the one or more hidden layers).

In some examples, the behavior prediction system 102 generates the reconstructed unsupervised deep neural network 500 by using an output of the unsupervised deep neural network 400 (e.g., a generated feature representation of a user) as an input into the unsupervised deep neural network 500 and modifying the output using a weight W connecting a hidden layer and an input layer and/or one or more offsets or values. In this example, the output of these operations is a reconstructed representation of the user. In this manner, the behavior prediction system 102 learns or trains the unsupervised deep neural network 500 to reconstruct a representation of a user using a generated feature representation of the user. In some embodiments, a difference between the initial representation (e.g., the representation used to generate the output) and the reconstructed representation may be large and the behavior prediction system 102 can minimize the following objective function:

$$\|v-v'\|_2$$

The function above can represent the $l_2$ distance between the initial representation and the reconstructed representation. In some examples, minimizing the function above can include modifying or adjusting one or more parameters of the unsupervised deep neural networks 400, 500 (e.g., a weight W connecting a hidden layer and an input layer and/or one or more offsets or values) to minimize the distance between the initial representation and the reconstructed representation. In this manner, the behavior prediction system 102 can fine-tune the unsupervised deep neural networks 400, 500 to cause the universal deep neural network 400 to accurately generate or encode an input representation into a feature representation and cause the universal deep neural network 500 to accurately reconstruct the input representation based on an input feature representation. Thus, in some embodiments, the behavior prediction system 102 fine-tunes the unsupervised deep neural networks 400, 500 and trains the unsupervised deep neural networks 400, 500 to accurately obtain or generate a joint probability distribution over a set of inputs such as, for example, v and h (e.g., a probability distribution of a user being associated with a particular user behavior or vice versa).

Returning to FIG. 2, in some embodiments, in block 206, the behavior prediction application 106 causes the behavior prediction system 102 to train or learn a first unsupervised deep neural network to generate or encode a first feature representation of each user that describes or indicates the user's behavior over a first period of time (e.g., over a first thirty day period).

In block 208, the second representation of the user is encoded into a second feature representation that is representative of the user's behavior. In some embodiments, the behavior prediction application 106 causes the behavior prediction system 102 to encode the second representation (e.g., the second representation of the user accessed in block 202) into the second feature representation using the second RBM (e.g., the second RBM of the deep recurrent neural network accessed in block 204). In some embodiments, the second feature representation of the user represents a summary of the user's second behavior over a second thirty day period, with respect to a service, product, etc. (e.g., frequency of use, type of use, etc.). In some embodiments, the behavior prediction application 106 causes the behavior prediction system 102 to encode the second representation into the second feature representation in substantially the same manner as described above with respect to block 206.

In block 210, a predicted user behavior model is generated by applying the deep recurrent neural network (e.g., the deep recurrent neural network accessed in block 204) to input data. In some embodiments, the behavior prediction application 106 causes the behavior prediction system 102 to generate the predicted user behavior model.

For example, the behavior prediction application 106 causes the behavior prediction system 102 to generate the predicted user behavior model by connecting the first unsupervised deep neural network and the second unsupervised deep neural network into a deep recurrent neural network (e.g., in block 204). In this example, the input data includes the feature representations of a user generated or encoded by the unsupervised deep neural networks (e.g., in blocks 206 and 208) and the target behavior dataset 116. In some examples, the behavior prediction system 102 uses the input data to train or learn the recurrent neural network to predict a particular user behavior. For example, FIG. 6 is an example of a deep recurrent neural network 600 that can be used to predict user behavior according to certain embodiments.

Figure 6:
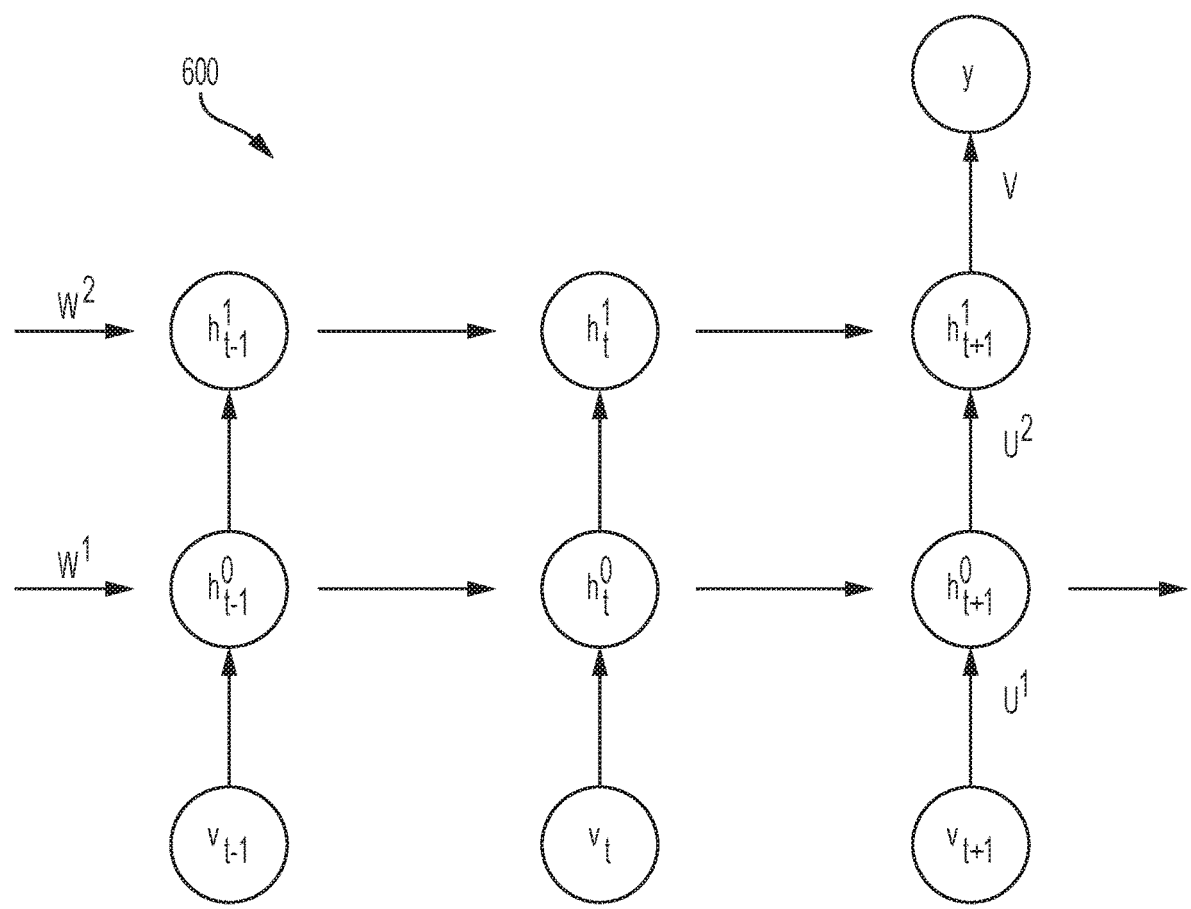
FIG. 6 is an example of a deep recurrent neural network that can be used to predict user behavior according to certain embodiments.
Figure 7:
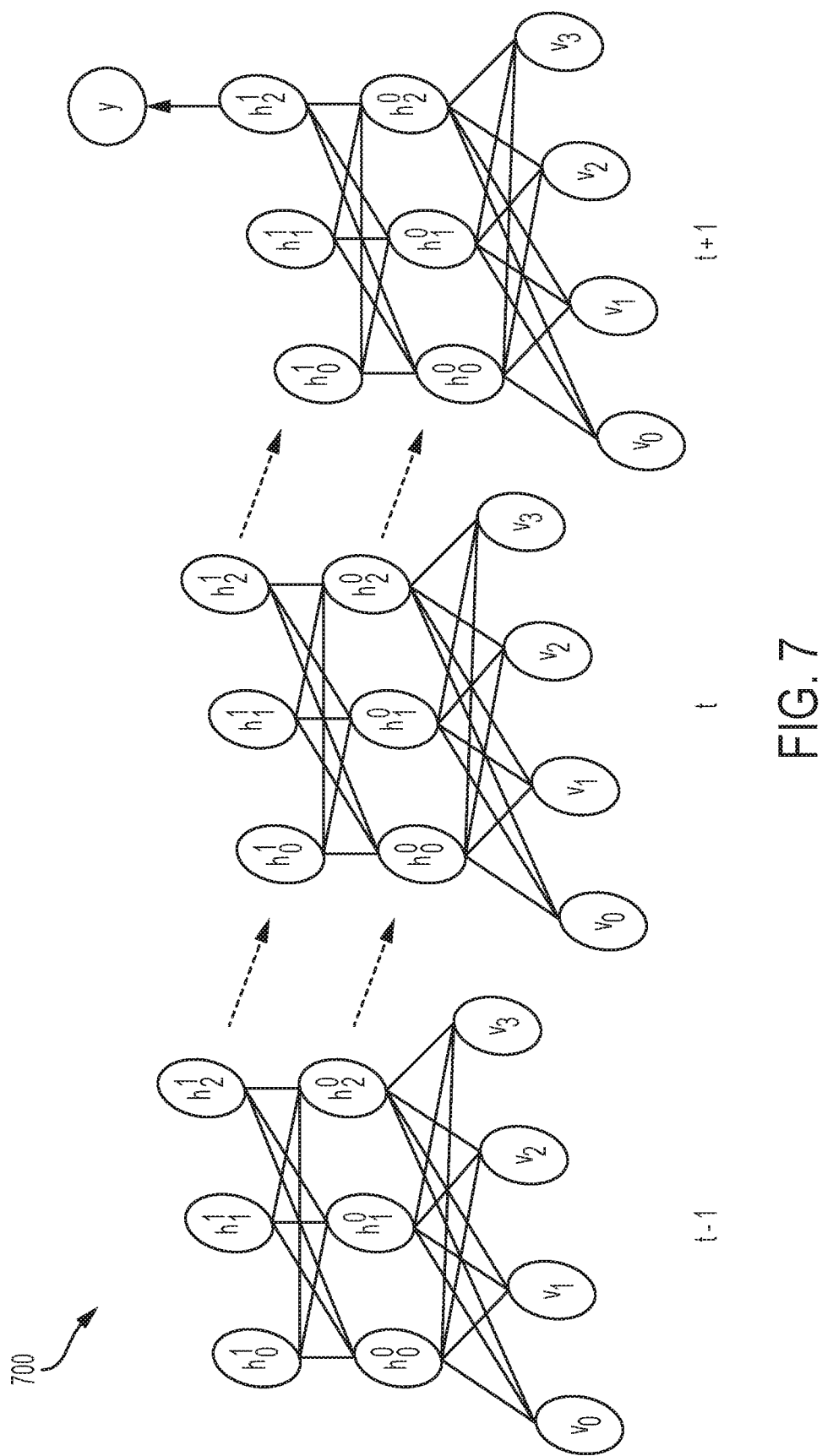
FIG. 7 is an example of another embodiment of the deep recurrent neural network of FIG. 6 that can be used to predict user behavior according to certain embodiments.

In the example depicted in FIG. 6, the behavior prediction system 102 connects various hidden layers h of various unsupervised deep neural networks into the deep recurrent neural network 600. In this example, the hidden layers $h^0_{t-1}$, $h^0_t$, and $h^0_{t+1}$ of three unsupervised deep neural networks are connected into the deep recurrent neural network 600. The hidden layers $h^1_{t-1}$, $h^1_t$, and $h^1_{t+1}$ f of the three unsupervised deep neural networks are also connected into the deep recurrent neural network 600. In this example, a first unsupervised deep neural network of the deep recurrent neural network 600 is used to generate or encode a first feature representation of a user over a first period of time, a second unsupervised deep neural network of the deep recurrent neural network 600 is used to generate or encode a second feature representation of a user over a second period of time, and a third unsupervised deep neural network of the deep recurrent neural network 600 is used to generate or encode a third feature representation of a user over a third period of time and the behavior prediction system 102 uses the deep recurrent neural network 600 to predict user behavior y. FIG. 7 is an example of another embodiment of the deep recurrent neural network of FIG. 6 that can be used to predict user behavior according to certain embodiments.

Returning to FIG. 2, in some examples, in block 210, the deep recurrent neural network of the predicted user behavior model is trained to predict user behavior. In some embodiments, the behavior prediction application 106 causes the behavior prediction system 102 to train the deep recurrent neural network to predict user behavior. For example, the behavior prediction application 106 causes the behavior prediction system 102 to obtain or receive one or more target behavior datasets 116 from the behavior prediction database 110 and the behavior prediction system 102 associates each user with a user behavior label based on the target behavior dataset 116. In some examples, a user behavior label associated with a user indicates whether a user performed a particular action during or after the first or second period of time. As an example, the target behavior dataset 116 includes user churn data indicating whether a user abandons a service or product during or after the first or second period of time (e.g., whether the user abandoned the service or product within thirty days after the first or second period of time) and the behavior prediction system 102 associates each user with a churn label that indicates the user's churn behavior (e.g., a label that indicates whether the user abandoned the service, product, or subscription during or after the first or second period of time). For example, the behavior prediction system 102 associates a user with a binary churn label that indicates the user's churn behavior (e.g., 0 if the user did not abandon a service or 1 if the user abandoned the service).

In some embodiments, the behavior prediction application 106 causes the behavior prediction system 102 to use the target behavior dataset 116 and the connected first and second unsupervised deep neural networks to train the deep recurrent neural network of the predicted user behavior model to predict user behavior. For example, the behavior prediction system 102 uses the connected first and second unsupervised deep neural networks, along with a user behavior label associated with each user, to train a deep recurrent neural network to predict user behavior. As an example, the behavior prediction system 102 connects the first and second unsupervised deep neural networks into the deep recurrent neural network and uses the feature representations generated or encoded by each unsupervised deep neural network over each time period (e.g., the feature representations generated in blocks 206 and 208) as inputs into the deep recurrent neural network. In this example, the behavior prediction system 102 inputs the user behavior labels associated with the various users into the deep recurrent neural network. The behavior prediction system 102 uses the inputs to train the deep recurrent neural network to predict a particular user behavior (e.g., to predict or determine a likelihood of a subsequent user abandoning a service or product or an amount of time after using the service or product that the user will, or is likely to, abandon the service or product).

For instance, the behavior prediction system 102 classifies or groups users based on a similarity between feature representations of the users (e.g., group together users that have similar user behavior with respect to a product or service) and identifies a churn label associated with each user in each group. In this example, the behavior prediction system 102 can predict or determine a likelihood of a subsequent user abandoning a service or product. As an example, the behavior prediction system 102 obtains data about the subsequent user's behavior with respect to a service or product and generates a feature representation for the subsequent user. The behavior prediction system 102 compares the subsequent user's feature representation to feature representations of users in various groups, identifies a group of users having similar user behaviors as compared to the subsequent user, and uses the recurrent neural network to predict a likelihood of the subsequent user abandoning a service or product based on various churn labels associated with one or more users in the identified group of users. As an example, the behavior prediction system 102 determines that there is a high likelihood that the subsequent user will abandon a services in response to determining that the subsequent user's behavior with respect to the service is similar to the user behavior of a particular group of users and that the users of the particular group are associated with a churn label that indicates that the group of users abandoned the service after a particular period of time.

Thus, in some embodiments, the behavior prediction system 102 uses one or more unsupervised deep neural networks (e.g., RBMs) to generate short-term feature representations of users over various time periods and connects the unsupervised deep neural networks into a deep recurrent neural network, which can then use the unsupervised deep neural networks and short-term feature representations to predict subsequent user behavior. In this manner, the behavior prediction system uses unsupervised deep neural networks, which can be less susceptible to noise or randomness in user behavior data sets and obviate the need for human intervention in generating feature representations of users, along with a deep recurrent neural network that can model time dependent or temporal user behavior, to accurately predict user behavior.

In some examples, the behavior prediction system 102 can be used to monitor or predict user behavior as described above, which can provide one or more advantages for customer relation operations. For example, the behavior prediction system 102 can predict a likelihood of one or more users abandoning a service or product or an amount of time after using the service or product that the users are likely to abandon the service or product. In this example, the behavior prediction system 102 can output data indicating the one or more users, the determined likelihood, or the determined amount of time. In some examples, the behavior prediction system 102 can output the data for determining one or more operations for retaining users including, for example, allocating electronic resources to one or more behavior prediction system 102 or servers for retaining users that have a likelihood of abandoning the service or product.

Although the unsupervised deep neural networks of FIGS. 4-5 and the deep recurrent neural networks of FIGS. 6-7 are depicted as having a certain number of layers or nodes, in other embodiments, the unsupervised deep neural networks and the deep recurrent neural networks each have any number of layers or nodes. Further, while the behavior prediction system 102 described above with respect to FIGS. 1-8 is described as predicting user churn behavior, various additional or alternative configurations are possible. For example, the behavior prediction system 102 can be configured to predict any user behavior.

System Implementation Example

Figure 8:
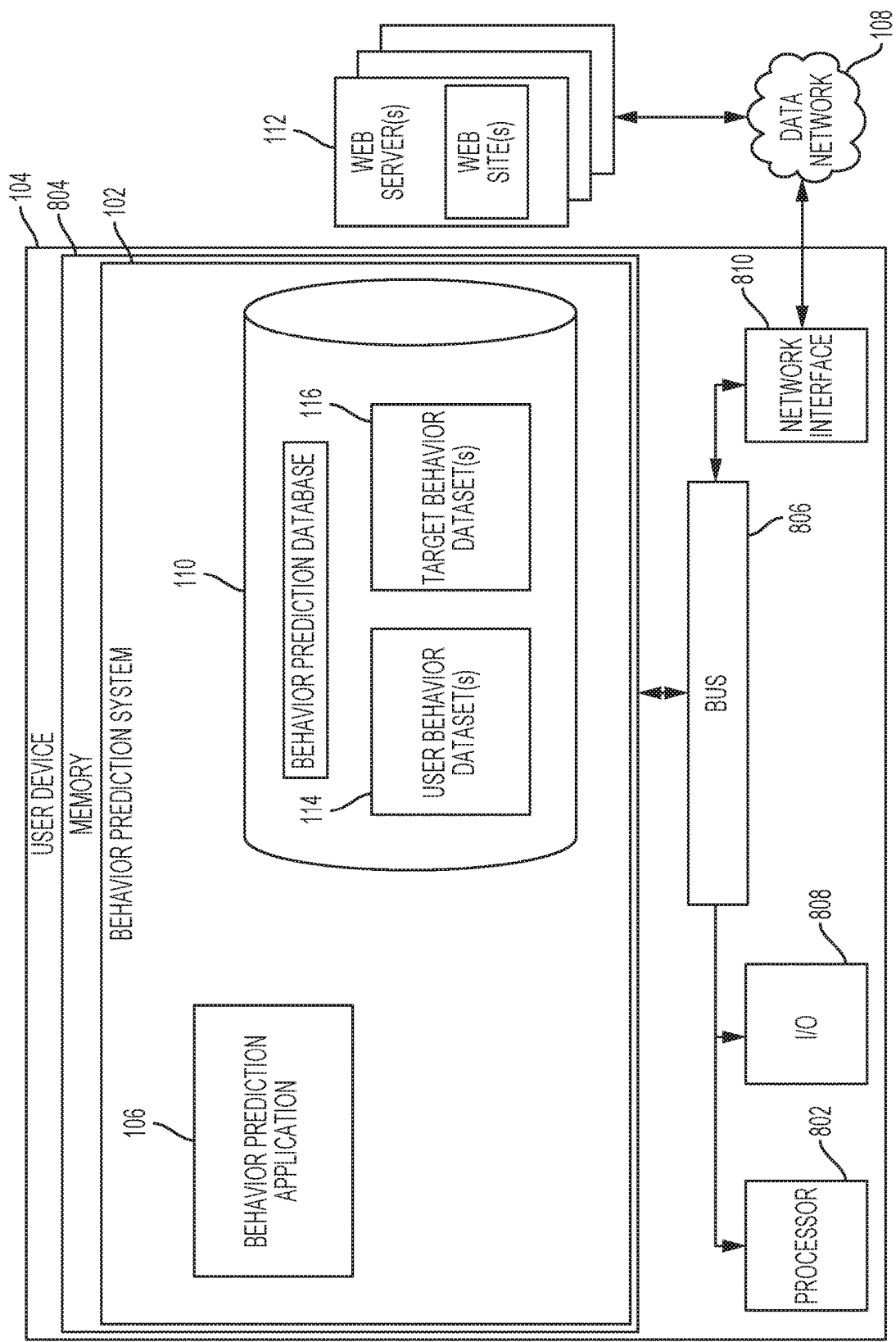
FIG. 8 is an example of a block diagram of a computing device that executes a behavior prediction system to generate a model for predicting user behavior using unsupervised feature learning and a recurrent neural network in accordance with one or more embodiments.

Any suitable computing system or group of computing systems can be used for performing the operations described herein. FIG. 8 is an example of a block diagram of a user device that executes a behavior prediction system 102 to perform operations described herein.

The depicted example of the user device 104 includes one or more processors 802 communicatively coupled to one or more memory devices 804. The processor 802 executes computer-executable program code stored in the memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including one or more processors 802 that are configured by program code to implement the operations described above, such as the operations depicted in FIG. 2 that are described with respect to processing devices.

The memory device 804 includes any suitable non-transitory computer-readable medium for storing the behavior prediction system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. One or more memory devices 804 are used to implement the operations described above, such as the operations depicted in FIGS. 1-2 that are described with respect to one or more non-transitory computer-readable media.

The user device 104 may also include a number of external or internal devices such as input or output devices. For example, the user device 104 is shown with an input/output ("I/O") interface 808 that can receive input from input devices or provide output to output devices. A bus 806 can also be included in the user device 104. The bus 806 can communicatively couple one or more components of the user device 104. In some embodiments, the bus 806 is used to implement the operations described above with respect to FIGS. 1-2 that involve communicating signals via a data bus.

The user device 104 executes program code that configures the processor 802 to perform one or more of the operations described above with respect to FIGS. 1-2. The program code includes, for example, behavior prediction application 106 or other suitable applications that perform one or more operations described herein. The program code may be resident in the memory device 804 or any suitable computer-readable medium and may be executed by the processor 802 or any other suitable processor. In some embodiments, the program code described above is stored in the memory device 804, as depicted in FIG. 8. In additional or alternative embodiments, the program code described above is stored in one or more memory devices accessible via a data network.

The user device 104 accesses the user behavior dataset 114 or the target behavior data set 116 in any suitable manner. In some embodiments, the user behavior dataset 114 or the target behavior data set 116 is stored in one or more memory devices accessible via a data network 108. In additional or alternative embodiments, some or all of the user behavior dataset 114 or the target behavior data set 116 is stored in the memory device 804.

The user device 104 depicted in FIG. 8 also includes at least one network interface 810. The network interface 810 includes any device or group of devices suitable for establishing a wired or wireless data connection to one or more data networks 108. Non-limiting examples of the network interface 810 include an Ethernet network adapter, a modem, and/or the like. The user device 104 is able to communicate with one or more web servers 112 via which a user may access the user behavior prediction system 102 or behavior prediction application 106. In some embodiments, the network interface 810 is used to implement the operations described above with respect to FIGS. 1-2 that involve communicating signals via a data network.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for generating a model for predicting user behavior, the method comprising:
   accessing, by a processor, a first representation of a user of a plurality of users and a second representation of the user, the first representation including data about a first behavior of the user over time intervals during a first time period and the second representation including data about a second behavior of the user over time intervals during a second time period;
   accessing, by the processor, a deep recurrent neural network comprising a first deep restricted Boltzmann machine connected to a second deep restricted Boltzmann machine;
   encoding, by the processor and with the first deep restricted Boltzmann machine, the first representation into a first feature representation that is representative of the first behavior;
   encoding, by the processor and with the second deep restricted Boltzmann machine, the second representation into a second feature representation that is representative of the second behavior; and
   generating, by the processor, a predicted user behavior model of the user by applying the deep recurrent neural network to input data, the input data comprising the first and second feature representations and a user behavior label associated with the user, wherein the user behavior label indicates whether the user performed a particular action during or after the first or second time period.

2. The method of claim 1, further comprising training the first and second deep restricted Boltzmann machines with representations of the plurality of users to encode the representations as feature representations, wherein training the first and second deep restricted Boltzmann machines comprises:
   providing a representation to the first deep restricted Boltzmann machine;
   providing another representation to the second deep restricted Boltzmann machine;
   encoding, with the first deep restricted Boltzmann machine, the representation into a feature representation by applying a first weight value associated with a connection between a hidden layer and an input layer of the first deep restricted Boltzmann machine, a first offset value, or a first activation function to the representation; and
   encoding, with the second deep restricted Boltzmann machine, the other representation into another feature representation by applying a second weight value associated with a connection between a hidden layer and an input layer of the second deep restricted Boltzmann machine, a second offset value, or a second activation function to the other representation.

3. The method of claim 1, further comprising:
   applying the deep recurrent neural network to predict the user behavior of a subsequent user by:
   generating, by the processor, a plurality of feature representations of the plurality of users;
   grouping, by the deep recurrent neural network, a subset of users of the plurality of users based on a similarity between feature representations of the subset of users and a similarity between user labels associated with the subset of users;
   receiving, by the deep recurrent neural network, a subsequent user feature representation of the subsequent user;
   comparing, by the deep recurrent neural network, the subsequent user feature representation to the feature representations of the subset of users; and
   predicting, by the deep recurrent neural network, a likelihood of the user behavior of the subsequent user based on the comparison and using the user labels associated with the subset of users.

4. The method of claim 1, wherein generating the first representation of the user and the second representation of the user comprises:
   generating, by the processor, a first matrix indicating the first representation; and
   generating, by the processor, a second matrix indicating the second representation, wherein the first matrix and the second matrix each comprise a row corresponding to a time interval during the first time period or the second time period and a column corresponding to the user's behavior during the time interval.

5. The method of claim 1, wherein generating the first feature representation of the user and the second feature representation of the user further comprises:
   reconstructing, by the processor, an input layer of the first deep restricted Boltzmann machine or the second deep restricted Boltzmann machine to generate a first tuned deep restricted Boltzmann machine or a second tuned deep restricted Boltzmann machine; and generating, by the processor and using the first tuned deep restricted Boltzmann machine or the second tuned deep restricted Boltzmann machine, the first feature representation or the second feature representation of the user.

6. The method of claim 3, wherein predicting the user behavior of the subsequent user comprises predicting a likelihood of the subsequent user abandoning a service or product.

7. The method of claim 3, wherein predicting the user behavior of the subsequent user comprises predicting an amount of time after using a service or product that the subsequent user will abandon the service or product.

8. A system comprising:
a processing device; and
a non-transitory computer-readable medium communicatively coupled to the processing device, wherein the processing device is configured to perform operations comprising:
 accessing a first representation of a user of a plurality of users and a second representation of the user, the first representation including data about a first behavior of the user over time intervals during a first time period and the second representation including data about a second behavior of the user over time intervals during a second time period;
 accessing a deep recurrent neural network comprising a first deep restricted Boltzmann machine connected to a second deep restricted Boltzmann machine;
 encoding the first representation into a first feature representation that is representative of the first behavior with the first deep restricted Boltzmann machine;
 encoding the second representation into a second feature representation that is representative of the second behavior with the second deep restricted Boltzmann machine; and
 generating a predicted user behavior model of the user by applying the deep recurrent neural network to input data, the input data comprising the first and second feature representations and a user behavior label associated with the user, wherein the user behavior label indicates whether the user performed a particular action during or after the first or second time period.

9. The system of claim 8, wherein the processing device is further configured to:
 train the first and second deep restricted Boltzmann machines with representations of the plurality of users to encode the representations as feature representations, wherein training the first and second deep restricted Boltzmann machines comprises:
 providing a representation to the first deep restricted Boltzmann machine;
 providing another representation to the second deep restricted Boltzmann machine; and
 encoding, with the first deep restricted Boltzmann machine, the representation into a feature representation by applying a first weight value associated with a connection between a hidden layer and an input layer of the first deep restricted Boltzmann machine, a first offset value, or a first activation function to the representation; and
 encoding, with the second deep restricted Boltzmann machine, the other representation into another feature representation by applying a second weight value associated with a connection between a hidden layer and an input layer of the second deep restricted Boltzmann machine, a second offset value, or a second activation function to the other representation.

10. The system of claim 8, wherein the processing device is further configured to:
 apply the deep recurrent neural network to predict user behavior of a subsequent user by:
 generating a plurality of feature representations of the plurality of users;
 grouping, using the deep recurrent neural network, a subset of users of the plurality of users based on a similarity between feature representations of the subset of users and a similarity between user labels associated with the subset of users;
 receiving, using the deep recurrent neural network, a subsequent user feature representation of the subsequent user;
 comparing, using the deep recurrent neural network, the subsequent user feature representation to the feature representations of the subset of users; and
 predicting, using the deep recurrent neural network, a likelihood of the user behavior of the subsequent user based on the comparison and using the user labels associated with the subset of users.

11. The system of claim 8, wherein the processing device is further configured to generate the first representation of the user and the second representation of the user by:
 generating a first matrix indicating the first representation; and
 generating a second matrix indicating the second representation, wherein the first matrix and the second matrix each comprise a row corresponding to a time interval during the first time period or the second time period and a column corresponding to the user's behavior during the time interval.

12. The system of claim 8, wherein the processing device is further configured to generate the first feature representation of the user and the second feature representation of the user further by:
 reconstructing an input layer of the first deep restricted Boltzmann machine or the second deep restricted Boltzmann machine to generate a first tuned deep restricted Boltzmann machine or a second tuned deep restricted Boltzmann machine; and
 generating, and using the first tuned deep restricted Boltzmann machine or the second tuned deep restricted Boltzmann machine, the first feature representation or the second feature representation of the user.

13. The system of claim 10, wherein the processing device is further configured to predict the user behavior of the subsequent user by predicting a likelihood of the subsequent user abandoning a service or product.

14. The system of claim 10, wherein the processing device is further configured to predict the user behavior of the subsequent user by predicting an amount of time after using a service or product that the subsequent user will abandon the service or product.

15. A system comprising:
 a means for accessing a first representation of a user of a plurality of users and a second representation of the user, the first representation including data about a first behavior of the user over time intervals during a first time period and the second representation including data about a second behavior of the user over time intervals during a second time period;

a means for accessing a deep recurrent neural network comprising a first deep restricted Boltzmann machine connected to a second deep restricted Boltzmann machine;

a means for encoding the first representation into a first feature representation that is representative of the first behavior with the first deep restricted Boltzmann machine;

a means for encoding the second representation into a second feature representation that is representative of the second behavior with the second deep restricted Boltzmann machine; and a means for generating a predicted user behavior model of the user by applying the deep recurrent neural network to input data, the input data comprising the first and second feature representations and a user behavior label associated with the user, wherein the user behavior label indicates whether the user performed a particular action during or after the first or second time period.

16. The system of claim 15, further comprising:

a means for training the first and second deep restricted Boltzmann machines with representations of the plurality of users to encode the representations as feature representations, wherein training the first and second deep restricted Boltzmann machines comprises:

providing a representation to the first deep restricted Boltzmann machine;

providing another representation to the second deep restricted Boltzmann machine; and encoding, with the first deep restricted Boltzmann machine, the representation into a feature representation by applying a first weight value associated with a connection between a hidden layer and an input layer of the first deep restricted Boltzmann machine, a first offset value, or a first activation function to the representation; and encoding, with the second deep restricted Boltzmann machine, the other representation into another feature representation by applying a second weight value associated with a connection between a hidden layer and an input layer of the second deep restricted Boltzmann machine, a second offset value, or a second activation function to the other representation.

17. The system of claim 15, further comprising:

a means for applying the deep recurrent neural network to predict user behavior of a subsequent user by:

generating a plurality of feature representations of the plurality of users;

grouping, using the deep recurrent neural network, a subset of users of the plurality of users based on a similarity between feature representations of the subset of users and a similarity between user labels associated with the subset of users;

receiving, using the deep recurrent neural network, a subsequent user feature representation of the subsequent user;

comparing, using the deep recurrent neural network, the subsequent user feature representation to the feature representations of the subset of users; and predicting, using the deep recurrent neural network, a likelihood of the user behavior of the subsequent user based on the comparison and using the user labels associated with the subset of users.

18. The system of claim 15, further comprising a means for generating the first representation of the user and the second representation of the user by:

generating a first matrix indicating the first representation; and generating a second matrix indicating the second representation, wherein the first matrix and the second matrix each comprise a row corresponding to a time interval during the first time period or the second time period and a column corresponding to the user's behavior during the time interval.

19. The system of claim 15, further comprising a means for generating the first feature representation of the user and the second feature representation of the user further by:

reconstructing an input layer of the first deep restricted Boltzmann machine or the second deep restricted Boltzmann machine to generate a first tuned deep restricted Boltzmann machine or a second tuned deep restricted Boltzmann machine; and generating, and using the first tuned deep restricted Boltzmann machine or the second tuned deep restricted Boltzmann machine, the first feature representation or the second feature representation of the user.

20. The system of claim 17, further comprising a means for predicting the user behavior of the subsequent user by predicting a likelihood of the subsequent user abandoning a service or product.

* * * * *